(12) United States Patent
Jagiella et al.

(10) Patent No.: US 6,828,780 B2
(45) Date of Patent: Dec. 7, 2004

(54) POSITION MEASURING SYSTEM HAVING AN INDUCTIVE ELEMENT ARRANGED ON A FLEXIBLE SUPPORT

(75) Inventors: Manfred Jagiella, Notzingen (DE); Reinhard Droxler, Eningen (DE)

(73) Assignee: BALLUFF GmbH, Neuhausen (DE)

( * ) Notice: Subject to any disclaimer, the term of this patent is extended or adjusted under 35 U.S.C. 154(b) by 0 days.

(21) Appl. No.: 10/141,310

(22) Filed: May 7, 2002

(65) Prior Publication Data

US 2002/0163328 A1 Nov. 7, 2002

Related U.S. Application Data

(63) Continuation-in-part of application No. 09/846,428, filed on May 1, 2001.

(30) Foreign Application Priority Data

May 19, 2001 (DE) .......................................... 101 24 483

(51) Int. Cl.[7] ................................................ G01B 7/14
(52) U.S. Cl. ............................. 324/207.16; 324/207.15; 324/207.24
(58) Field of Search ....................... 324/207.11, 207.22, 324/207.24, 207.15, 207.16, 207.17, 207.18; 336/20, 225, 232

(56) References Cited

U.S. PATENT DOCUMENTS

| | | | |
|---|---|---|---|
| 4,774,465 A | 9/1988 | Nilius | |
| 4,806,859 A | * 2/1989 | Hetrick | .................. 324/207.15 |
| 5,055,814 A | 10/1991 | Morimura et al. | |
| 5,204,621 A | 4/1993 | Hermann et al. | |
| 5,619,133 A | 4/1997 | Shank et al. | |
| 5,721,487 A | 2/1998 | Milosevic | |
| 5,742,161 A | 4/1998 | Karte | |
| 5,867,022 A | 2/1999 | Eden et al. | |
| 5,949,293 A | 9/1999 | Akamatsu et al. | |

FOREIGN PATENT DOCUMENTS

| | | |
|---|---|---|
| CA | 2232916 | 9/1998 |
| DE | 25 11 683 | 10/1976 |
| DE | 25 20 851 | 11/1976 |
| DE | 36 10 479 | 10/1987 |
| DE | 39 13 861 | 11/1989 |
| DE | 39 14 787 | 11/1990 |
| DE | 41 03 603 | 8/1991 |
| DE | 42 13 866 | 10/1992 |
| DE | 42 05 957 | 9/1993 |
| DE | 42 39 635 | 5/1994 |
| DE | 43 30 540 | 3/1995 |
| DE | 44 06 417 | 9/1995 |
| DE | 44 45 819 | 6/1996 |
| DE | 43 11 973 | 2/1997 |
| DE | 196 19 197 | 11/1997 |
| DE | 198 06 290 | 8/1998 |
| DE | 197 12 833 | 10/1998 |
| DE | 197 15 360 | 10/1998 |
| DE | 198 06 529 | 8/1999 |
| DE | 100 44 839 | 4/2001 |
| EP | 0 351 609 | 1/1990 |
| EP | 0 463 236 | 1/1992 |
| EP | 0 557 608 | 9/1993 |
| FR | 2 682 760 | 4/1993 |
| GB | 1 502 697 | 3/1978 |
| JP | 402278119 | * 11/1990 ............ 324/207.11 |

OTHER PUBLICATIONS

"Siemens Components", Heft 4 (vol. 4), 1998, pp. 18 and 19.

* cited by examiner

*Primary Examiner*—Jay Patidar
(74) *Attorney, Agent, or Firm*—Barry R. Lipsitz; Douglas M. McAllister

(57) ABSTRACT

In order to improve a position measuring system comprising a transmitter and a sensor which comprises at least one inductive element, to which the transmitter is coupled electromagnetically, wherein sensor and transmitter can be positioned relative to one another and the at least one inductive element is arranged on a support so as to be areally extended, such that a great number of possibilities for its use result it is suggested that the support with the at least one inductive element be designed to be as least partially flexible.

34 Claims, 4 Drawing Sheets

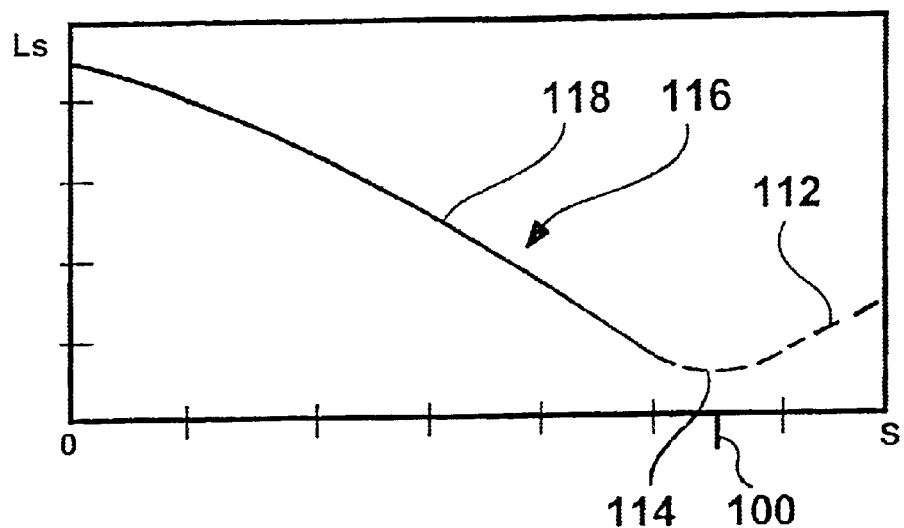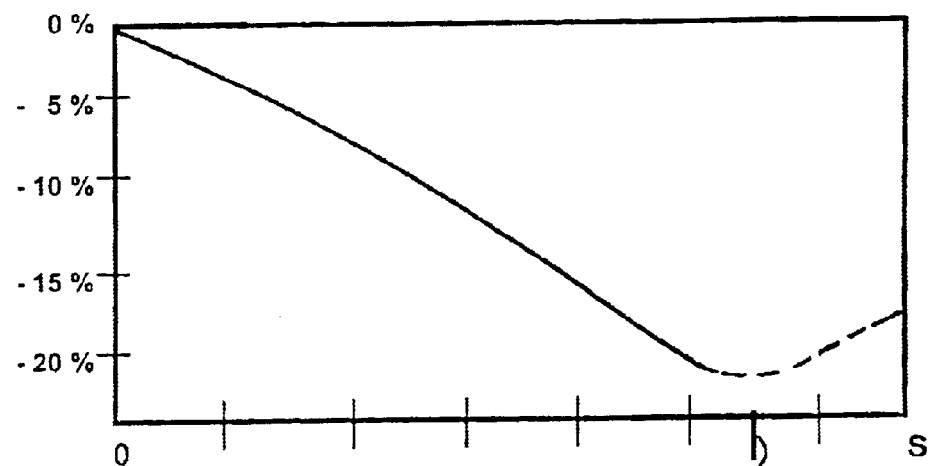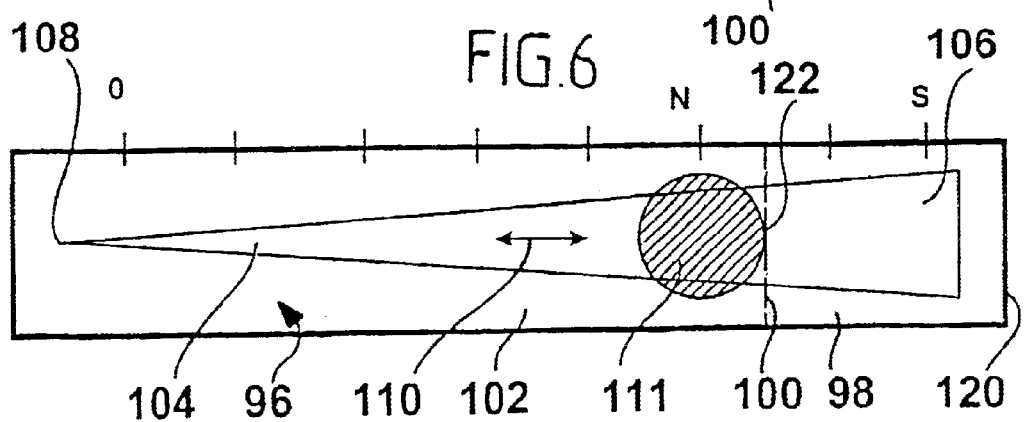

US 6,828,780 B2

POSITION MEASURING SYSTEM HAVING AN INDUCTIVE ELEMENT ARRANGED ON A FLEXIBLE SUPPORT

This application is a continuation-in-Part of U.S. patent application Ser. No. 09/846,428 filed on May 1, 2001.

The present disclosure relates to the subject matter disclosed in German applications No. 101 24 483.5 of May 19, 2001 and No. 200 09 335.5 of May 24, 2000, which are incorporated herein by reference in its entirety and for all purposes.

BACKGROUND OF THE INVENTION

The invention relates to a position or path measuring system comprising a transmitter and a sensor which comprises at least one inductive element, to which the transmitter is coupled electromagnetically, wherein sensor and transmitter can be positioned relative to one another and the at least one inductive element is arranged on a support so as to be areally extended.

Position measuring systems of this type are used, for example, for measuring positions on pneumatic cylinders, for measuring the position of valves, in particular, in closed-loop control circuits or in gripping devices. It is very advantageous for such uses when a relative path between transmitter and sensor can be measured absolutely.

It is known from DE 42 05 957 A1 to provide a transmitter guide which is movable relative to a coil structure with a triangular attenuating surface consisting of an electrically conductive material, wherein the attenuation increases, the nearer the coil structure approaches the end of the attenuating surface which reaches over the entire width of the transmitter guide.

The object underlying the invention is to improve a position measuring system of the type specified at the outset in such a manner that a great number of possibilities for its use result.

SUMMARY OF THE INVENTION

This object is accomplished in accordance with the invention in that the support with the at least one inductive element is designed to be at least partially flexible.

The shape of the support may be varied due to its flexible design and, in particular, varied such that the support with the inductive element arranged thereon can be curved, i.e. can be brought into a shape which is not flat. For example, the support may, as a result, be adapted to contours of an object in order to be able to carry out a position determination in the case of curved path movements. If, for example, the support is adapted to the path curvature, the relative distance between the support and the transmitter may be kept constant even with a curved path movement and so the position determination is not influenced by any alteration in the relative distance, i.e. the sensor signal experiences in accordance with the invention a change solely due to the movement along the path direction and not along transversely to the path direction.

As a result of an at least partially flexible design of the support, the useful length range with respect to the position determination of the position measuring system is also increased, namely with the same length of a corresponding measurement section or with the same useful area the length of the corresponding measurement section is reduced: Edge areas of the inductive element influence the sensor signal so that a non-monotonic dependence of a characteristic value of the inductive element, such as factor Q or effective inductance, results, for example, at these areas. This means for the application that only a certain section of the inductive element can be used for the position determination and the edge areas outside this are necessary in order to provide the areally extended inductive element but, otherwise, increase the length of the system. In the case of a flexible design of the support, such edge areas can be bent away and, in particular, folded out of the measurement field so that the length of the measurement section can be reduced along the measurement direction. As a result, an increase in thickness is caused to a certain degree but this may be kept slight in that, for example, the edge sections bent away are folded or rolled behind the support.

It is advantageous when the at least one inductive element is imprinted on the support. As a result, an areal extension thereof may be provided in a simple manner and corresponding path conductors may also be produced so as to be thin so that a flexibility of the support is ensured at least in a section with the inductive element arranged thereon.

A flexible design of the support may be achieved in a simple manner when this comprises a flexible foil. The flexible foil is a printed circuit board foil, on which the inductive element is arranged. A foil has a bending flexibility parallel to its surface in its normal directions.

It is particularly advantageous when the support comprises a rigid support section and one or more flexible support sections which are arranged on the rigid support section. The flexible support sections may then be bent away from the rigid support section in order to move them out of the measurement field of the sensor. The length of the usable measurement range is then determined by the dimensions of the rigid support section.

It is advantageous when, for providing a usable measurement area with respect to the at least one inductive element, one or more edge sections of the support are arranged with respect to the measurement section of the support in such a manner that they are located outside a measurement field. The length dimensions of the measurement section in a position measuring direction determine the usable distance measuring area and also the outer dimensions of the sensor since the edge sections may be bent away from the measurement section and, therefore, contribute nothing or only little to the longitudinal extension of the sensor. The measurable path is then essentially determined by the length of the measurement section.

Due to the edge section or sections of the support, end edge areas of the at least one inductive element are favorably located outside the measurement field. Such end edge areas, such as, for example, the apexes of triangles in the case of a triangular flat coil as inductive element, influence the sensor signal since, on the one hand, a transition takes place at this point between an electromagnetically couplable area and an area which is not electromagnetically couplable and since, on the other hand, the winding density and also line directions, for example, differ more greatly at these edge areas than in the case of areas outside these edge areas.

It is favorable when the measurement section of the support is of a rigid design since the edge sections of the support may then be folded away in a simple manner and may also be positioned behind the measurement section in order to keep the thickness extension slight as a result of the edge sections being bent away.

The edge section or sections of the support are advantageously arranged so as to be flexible with respect to the measurement section in order to be able to bend them away from it. This may be achieved, for example, in that a flexible foil is arranged on a rigid subsupport which has essentially the dimensions of the measurement section. This flexible foil is then connected to the measurement section so that the support is rigid in this area. Outside the subsupport the measurement foil may be bent relative to it and therefore to the measurement section. An alternative possibility is to arrange the edge sections themselves on the measurement section so as to be flexible, for example, to arrange them on a rigid printed circuit board so as to be flexible.

It is, furthermore, favorable when an edge section is arranged on the measurement section so as to be bent away or to be bendable away from it in order to limit the usable measurement area essentially to the measurement section.

In order to keep the thickness dimensions transversely to the measurement direction small, the edge section or sections are favorably positioned behind the support in relation to a measurement field. On the one hand, they do not interfere with the measurement and, on the other hand, the corresponding thickness dimensions of the sensor are kept small. For this purpose, an edge section is, in particular, arranged so as to be rolled and, in particular, rolled behind the support or an edge section is arranged so as to be folded and, in particular, folded around behind the support.

In a variation of one embodiment which is simple to produce from a technical point of view, the at least one inductive element is a printed coil which is imprinted on the support.

For the simple evaluation of a sensor signal, the at least one inductive element is favorably coupled to an oscillator and influences this via a factor Q and/or an effective inductance. The factor Q and/or effective inductance of the inductive element is advantageously determined by the size of an effective sensor area which is coupled to the transmitter and the sensor is designed such that the size of the effective sensor area is dependent on the relative position between transmitter and sensor transversely to a path direction. As a result of the fact that the inductive element is coupled to an oscillator and influences characteristic values of the oscillator, such as amplitude, phase position and frequency, via its factor Q and/or its effective inductance, a coupling of a transmitter to the inductive element, which is dependent on location, may be evaluated in a simple manner in that the corresponding characteristic values of the oscillator are evaluated. The inductive element is coupled to the oscillator such that this can be influenced itself. A special case of the coupling of the inductive element to the oscillator is the fact that the inductive element itself forms the inductance of the oscillator. Therefore, no primary coil need be supplied with energy and so a simple construction of the position measuring system can be achieved. The transmitter may be designed as a passive element and so it need not be acted upon with current via energy supply lines.

The sensor signal is determined by the geometric structure of the sensor or the transmitter, respectively. The information concerning the relative position between transmitter and sensor and, therefore, the distance information, path information or position information of the relative position between transmitter and sensor is contained in the geometric shape of the effective sensor area. The effective sensor area is, again, determined by the shape given to the sensor and, therefore, in particular, by the shape given to the inductive element. The inventive position measuring system may be designed in a simple manner and produced inexpensively as a result.

The position measuring system may be used universally and, in particular, in a rotary transmitter, as well, due to a corresponding design of the sensor. Apart from the inductive element, no further secondary coil or the like need be provided. In principle, it is sufficient to use a single, inductive element which is designed such that an effective sensor area is dependent on the relative position between transmitter and sensor. In addition, it is, however, also possible to provide additional, inductive elements. In this way, difference measurements or cumulative measurements may, for example, be carried out in order to obtain a high measurement accuracy or measurement resolution. For example, it may be provided in accordance with the invention for several measurement tracks to be used, for example, a measurement track for rough measurements and a measurement track for fine measurements. Since the information concerning location is in fact contained in the shape given to the effective sensor area, a great number of possibilities for use may be realized by adapting the shape.

A resolution for the measurement may be adjusted directly via the shape given to the effective sensor area. In this respect, resolutions at least in the order of magnitude of one thousandth of the total distance, which sensor and transmitter can take up relative to one another, can be realized without any problem.

Since the sensor signal is determined by an effective sensor area and, therefore, the sensor signal is determined directly by an effective inductance of the inductive element of the sensor, known evaluation circuits for inductive proximity switches, with which the approach of a metal object towards an oscillator coil is registered, for example, via a change in the amplitude or a change in the frequency of the oscillator, can be used. It is therefore possible to use evaluation units which are already available. The inventive position measuring system may be provided, in particular, with a type of evaluation unit irrespective of the special configuration of the transmitter or the inductive element since the evaluation unit essentially determines only a characteristic value of this inductive element.

The sensor is preferably designed such that an area of overlap between a projection of an effective transmitter surface area onto the sensor and an effective sensor surface area is dependent on the relative position between sensor and transmitter transversely to a direction of projection. The relative position between sensor and transmitter transversely to the direction of projection (transversely to the distance direction between sensor and transmitter) may be determined from this dependency.

An evaluation unit is provided, in particular, and this determines a characteristic value of the oscillator. A transmitter which is of a metallic design and, in particular, is electrically conductive, represents a counterinductance to the inductive element of the sensor. The coupling of the inductance causes a change in the effective inductance of the inductive element on the flexible support. This change in the effective inductance may be measured in a simple manner. In a variation of one embodiment it is provided for a frequency of the oscillator, to which the inductive element is coupled, to be measured as characteristic value. The frequency of an LC oscillatory circuit is essentially inversely proportional to the root of the effective inductance. This may be determined in a simple manner. This variation is particularly advantageous when the transmitter is a magnet and, in particular, a permanent magnet since, as a result, a relatively large change in inductance can occur which affects the frequency of the oscillatory circuit accordingly, in particular, when a soft magnetic material, which can be brought into a state of saturation locally, is arranged on the sensor.

In an alternative variation, an amplitude of the oscillator, to which the at least one inductive element is coupled, is determined. The amplitude of an oscillator and, in particular, an oscillatory circuit is, again, dependent on the effective inductance or factor Q of the inductive element of the sensor. It may be determined in a simple manner. It is possible to determine changes in amplitude which are relatively small. The effective inductance may also be evaluated when the transmitter is a non-magnetic metal.

It may be provided for the evaluation unit to be arranged on a support, on which the at least one inductive element is seated. Evaluation unit and inductive element are then integrated on one support, wherein provision must be made, however, for the flexibility of the support at least in one section. The sensor may be produced in a simple and inexpensive manner as a result of this integrated arrangement and the installation, for example, in a housing is accordingly simple during use.

The measurable path is favorably determined by the length of a measurement section, on which the at least one inductive element is arranged such that end edge areas of the inductive element are located outside the measurement section. As a result, edge effects with respect to effective sensor surface areas may be eliminated to a certain extent since the edge areas of the inductive element causing the edge effects are moved out of the measurement field.

It is particularly advantageous when the transmitter is a passive element and is, in particular, produced from an electrically conductive or magnetically conductive material. A passive transmitter is a transmitter which is not connected to a source of energy and nevertheless causes an electromagnetic coupling to the inductive element. In particular, no energy supply lines for the transmitter, which would perhaps have to be moved with it, need be provided.

In a particularly simple variation of one embodiment, which can also be produced inexpensively as a result, the transmitter comprises a magnet and, in particular, a permanent magnet. Its magnetic field influences the inductive element and this influence is again expressed in a change in the effective inductance. This change is, again, dependent on the effective sensor area of the inductive element which is acted upon by the magnetic field. With such a transmitter it is also possible to measure through metallic walls. For example, the position of a piston provided with such a transmitter may be detected from the outside through a wall of a pressurized cylinder consisting of aluminum.

In this respect, it is favorable when soft magnetic material is arranged on or in the vicinity of the inductive element. In the case of the soft magnetic material, this is, for example, a Mu metal in the form of a foil which has as high a permeability as possible and as small an electric conductivity value as possible. As a result of the magnetic field of the transmitter, the soft magnetic material may be brought locally into a state of saturation; an effective sensor area is defined by this local saturation. The local saturation at the effective sensor area again causes a relatively strong change in the effective inductance which can therefore be easily detected.

For example, the soft magnetic material is, for this purpose, applied to the support on one side or on both sides. It may also be provided for the soft magnetic material to be wound around the support.

In principle, an effective sensor area, which is dependent on the positioning of a transmitter in relation to the sensor, can be adjusted in that the at least one inductive element is designed in such a manner that its shape along a measurement path varies transversely to the measurement path. It is also possible, alternatively or in addition, for the soft magnetic material to be arranged in such a shape that the shape dimension in relation to a measurement path varies along the measurement path. Since an effective sensor area can be brought into a state of saturation locally due to the soft magnetic material, an effective sensor area is also determined by the design of the soft magnetic material itself. Outside the soft magnetic material, the magnetic field action of the sensor is different to that at the soft magnetic material, and the effective sensor area is therefore determined by the type of application of the soft magnetic material. It is provided, in particular, for the soft magnetic material to be arranged in the form of a triangle. As a result, the transverse dimensioning of the soft magnetic material varies along the measurement path and the relative position between transmitter and sensor may be determined via the variation in the transverse dimensioning.

It is favorable when the at least one inductive element is designed in such a manner that its shape transverse to a measurement path varies along the measurement path. This may be achieved in a simple manner via the corresponding design of the windings of a flat coil. The effective sensor area varies due to the alteration in its shape transversely to the measurement path. The size of the effective sensor area is again responsible for the sensor signal and this sensor signal then contains the information concerning the relative position.

It is particularly favorable when a magnetic screening is provided for the at least one inductive element in the form of a "magnetic cage" so that interference fields, such as the earth's magnetic field, do not influence the position determination. The magnetic screening screens not only the inductive element but also the transmitter.

In the case of the inventive distance measuring system it is possible to design the sensor such that via the corresponding shaping a specific characteristic curve of the position measuring system for a sensor signal can be and, in particular, is adjusted as a function of a measurement path. For example, an at least approximately linear signal curve can be set in order to be able to allocate a measurement parameter in a simple manner to a specific distance measuring path.

In order to monitor the functioning of the position measuring system it is advantageous when an error signal can be derived from the evaluation unit, wherein it can be checked whether one or more parameters of the inductive element are in a tolerance range. It is checked, in particular, whether the factor Q and/or effective inductance do not deviate to too great an extent upwards or downwards from still acceptable values. A plausibility check may then be carried out, with which a break in the coil, a short circuit or even a failure/movement of the transmitter out of the measurement area may, for example, be detected.

In a variation of one embodiment which is simple to produce, the at least one inductive element is of a triangular design and, in particular, it has triangular windings. If the direction parallel to a vertical direction of the triangle is selected as measurement direction, the transverse extension of the triangle then decreases or increases linearly in one direction so that a varying effective sensor area may be adjusted geometrically in this way.

The following description of preferred embodiments serves to explain the invention in greater detail in conjunction with the drawings.

BRIEF DESCRIPTION OF THE DRAWINGS

FIG. 6 shows a sensor support similar to that of FIG. 4 with a transmitter positioned above it, wherein a right-hand edge section is of a flexible design;

FIG. 7 shows the curve of the effective inductance Ls over the measuring path s in the case of the sensor according to FIG. 6, and FIG. 8 shows the curve of the deviation ÄLs of the effective inductance from its maximum value at s=0 for the sensor according to FIG. 6.

DETAILED DESCRIPTION OF THE INVENTION

Figure 1:
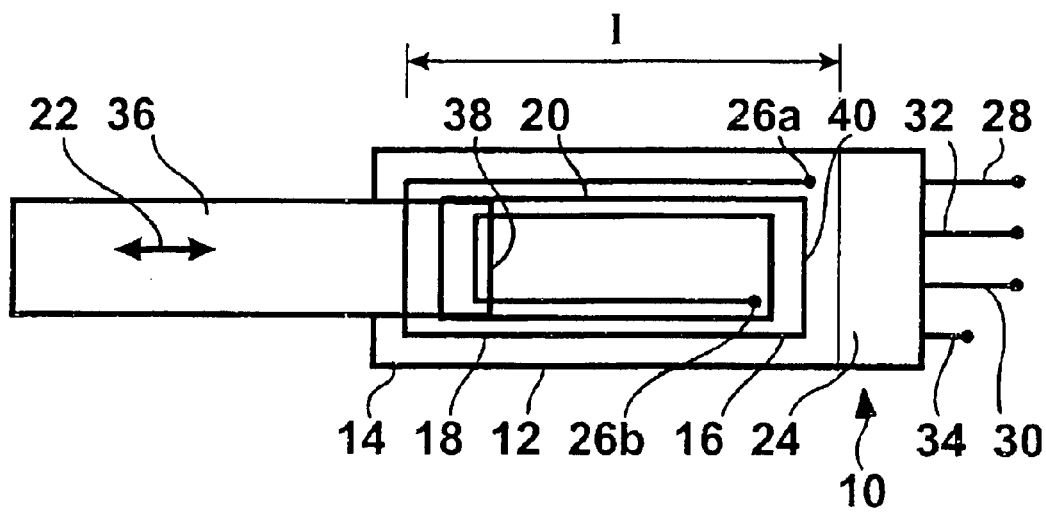
FIG. 1 shows a schematic illustration of a first embodiment of an inventive position measuring system.

In a first embodiment of an inventive position measuring system, which is designated in FIG. 1 as a whole as 10, a sensor 12 is provided which comprises a support 14, on which an inductive element 16 is arranged.

The inductive element is formed by a coil (flat coil) arranged areally on the support 14, wherein the inductive element 16 is, in particular, imprinted on the support 14 (printed coil).

The flat coil 16 comprises a plurality of windings 18 and, as a result, occupies a surface area 20 on the corresponding surface of the support 14. In the embodiment shown in FIG. 1, the windings 18 are essentially arranged parallel, spaced and in a spiral shape so that the surface area 20 on the support 14 is essentially rectangular. The direction of the windings is uniform.

It may, however, also be provided for the windings to be arranged in a meandering shape with alternating directions of winding (not shown in the drawings).

The flat coil 16 is aligned in a direction 22 and a length l of the flat coil 16 essentially defines the maximum possible distance which can be measured by means of the inventive position measuring system 10.

An evaluation unit 24 is provided for evaluating a sensor signal of the sensor 12 and this is connected to the support 14, for example, via corresponding electric connection lines which lead to the evaluation unit 24 from connections 26a, 26b of the flat coil 16 or from additional connections in electric contact with these connections 26a, 26b. (These connecting lines are not shown in the drawings).

It may also be provided for the evaluation unit 24 to be connected in one piece to the support 14 for the inductive element 16 (flat coil) and for the support 14 with the sensor 12 and the evaluation unit 24 to be integrated on a printed circuit board.

The evaluation unit 24 is known per se. It has, for example, two voltage supply inputs 28, 30, a signal output 32 and facultatively an error output 34. An oscillator is integrated into the evaluation unit 24 and the flat coil 16 is coupled to the oscillator such that characteristic values of the oscillator, such as frequency and factor Q, are influenced by the flat coil 16. Alternatively thereto, the flat coil 16 itself can form the inductance of an oscillator.

A transmitter 36 designed as a tongue or a hoop and consisting of a metallic material can be pushed over the flat coil 16. The transmitter 36 is a passive transmitter which is coupled directly and electromagnetically to the flat coil 16 without it needing to be acted upon by a current. It is arranged at a distance above the flat coil 16 (in FIG. 1 above the plane of drawing) on an object, the relative positioning of which is intended to be determined along the direction 22 in relation to the sensor 12.

The flat coil 16 may be screened by a "magnetic cage", wherein the transmitter 36 and the sensor 12 are positioned within the magnetic cage and are movable relative to one another within the cage. The magnetic cage is formed, for example, by ferrite foils or the like.

The inventive position or path measuring system according to the first embodiment 10 operates as follows:

If the metallic tongue 36 is brought into the vicinity of the flat coil 16, an inductive coupling between the flat coil 16 and the metallic transmitter 36 results. As a result of this, the effective inductance of the flat coil 16, and, therefore, its factor Q, alters on account of the electromagnetic coupling to the transmitter 36. The extent of the alteration is thereby dependent on what surface area of the flat coil 16 is covered by the transmitter 36, i.e. how large the area of overlap of a projection of the transmitter 36 onto the sensor 12 with an effective sensor area and, in particular, a covered coil area is. If, for example, the transmitter 36 is positioned outside the flat coil 16, no area of overlap is present and the effective inductance which can be measured at the flat coil 16 corresponds essentially to its inductance without any inductive countercoupling of an external object.

The maximum covered area is reached when an end 38 of the transmitter 36 is located over an end 40 of the flat coil 16 and the transmitter 36 is located over the flat coil 16, i.e. when the projection of the transmitter 36 onto the sensor 12 has a maximum surface area on the sensor 12 with respect to the flat coil 16.

The sensor signal which is detected by the evaluation unit 24 is thereby determined by the effective inductance or factor Q of the flat coil 16; a suitable sensor signal is, in particular, the amplitude of an oscillatory circuit of the oscillator, to which the flat coil 16 is coupled. This amplitude depends on the factor Q of the flat coil 16 and, therefore, on the relative position between transmitter 36 and sensor 12.

The flat coil 16 may itself form the inductance of the oscillatory circuit or be coupled to an additional coil of the oscillatory circuit and, as a result, influence the inductance of the oscillatory circuit and, therefore, its effective inductance.

Since the effective inductance of the flat coil 16 is dependent on where the end 38 of the transmitter 36 is located over the flat coil 16, it may be clearly determined via the determination of the effective inductance of the flat coil 16 or via the factor Q where the end 38 of the transmitter 36 is located. The relative positioning of the end 38 of the transmitter 36 with respect to the end 40 of the flat coil 16 determines the surface area, with which the metallic tongue 36 can be coupled to the flat coil 16. This is, again, determined by the relative position between the transmitter 36 and the sensor 12 in relation to the direction 22. In this way, a position measurement along the direction 22 may be carried out by means of the position measuring system 10. In particular, it may be determined at any point of time how the transmitter 36 is positioned relative to the sensor 12.

The evaluation unit 24 checks, in particular, whether the factor Q/effective inductance of the flat coil 16 is within a tolerance range. If this is not the case, an error signal is passed to the error output 34. For example, the flat coil 16 may be monitored in a simple manner, as a result, with respect to breakage of the coil.

In accordance with the invention, it is provided for the support 14 with the inductive element 16 arranged thereon to be at least partially of a flexible design.

As a result, it is possible to adapt the support 14 to non-planar contours or to shape the support 14 such that a constant distance between the sensor and the transmitter transversely to the path direction of the transmitter can be provided even with a path of the transmitter which is not straight.

The flexible design of the support 14 with the inductive element 16 arranged thereon may be provided, for example, due to the fact that the support 14 is formed by a flexible foil, on which the inductive element 16 is imprinted as a printed coil and the corresponding path conductors of the printed coil 16 are dimensioned in such a manner that they do not break even when the support 14 is bent.

Figure 2:
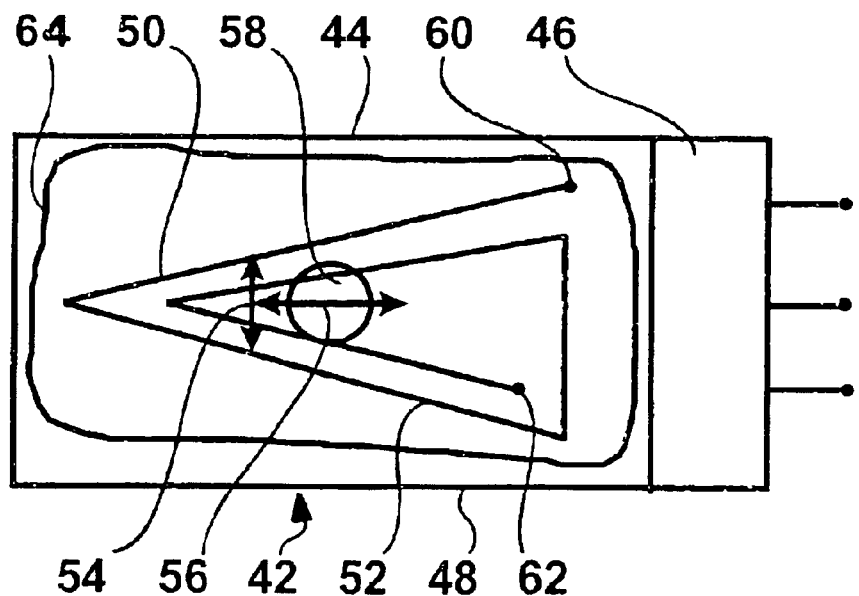
FIG. 2 shows a schematic illustration of a second embodiment of an inventive position measuring system.

In one embodiment shown in FIG. 2 and designated as a whole as 42, a flexible support is again provided which is connected to an evaluation unit 46. The evaluation unit 46 is, in principle, of the same design as the evaluation unit 24 described above in conjunction with the first embodiment 10.

A sensor 48 is formed by means of the support 44 which again comprises an inductive element 50 which is of an areal design, is arranged on the support 44 as a flat coil and, in particular, is imprinted on it as a printed coil. The flat coil 50 thereby follows a curvature of the flexible support 44 when this is bent such that it has a non-planar shape.

The flat coil 50 is formed by triangular windings 52 so that a transverse extension 54 of a surface area which is occupied by the flat coil 50 on the support 44 varies in a measurement direction 56 and, in particular, increases or decreases monotonically. In the case of a triangular design of the flat coil 50, the transverse extension 54 increases or decreases linearly. The measurement direction 56 is that direction, in which a transmitter 58 is positioned and, in particular, is moved above the sensor 48 relative to it, and is oriented transversely to a distance direction between the transmitter 58 and the inductive element 50.

In the embodiment shown in FIG. 2, the measurement direction 56 is essentially at right angles to the transverse extension 54 and the measurement direction 56 is parallel to a vertical direction of the triangular structure of the inductive element 50. The transverse extension 54 is then essentially parallel to a base direction of this triangular structure.

The windings 52 of the flat coil 50 extend in the embodiment shown in FIG. 2 in a spiral shape and flat between a first connection 60 and a second connection 62 which are, again, connected to the evaluation unit 46 in an electrically conductive manner.

In a variation of one embodiment, a soft magnetic material, indicated by the reference numeral 64, is applied to the support 44.

It may also be provided for the soft magnetic material to be wound around the support 44.

A Mu metal is used, for example, as soft magnetic material.

The transmitter 58 is formed by a magnet and, in particular, by a permanent magnet. It may also be an electromagnet. The magnetic field of the transmitter 58 acts upon the flat coil 50 and alters its effective inductance. In this respect, it brings the soft magnetic material 64 into a state of saturation locally. As a result of this saturation effect, the effective inductance of the flat coil 50 is altered to a particularly great extent. As a result of the locality of this saturation effect caused by the local action of the magnetic field and by the change in surface area of the flat coil 50 via the alteration of the transverse extension 54 in the measurement direction 56, the effective inductance of the flat coil 50 is therefore altered as a function of the position of the magnetic transmitter 58 above the sensor 48 along the measurement direction 56.

It may be provided alternatively or in addition for the flat coil 50 to essentially not vary in its shape along the measurement direction (cf., for example, the flat coil 16 according to FIG. 1) but for the soft magnetic material 64 to be applied such that its shape varies transversely to the measurement direction in order to be able to adjust an effective sensor area varying in measurement direction. For example, a triangular Mu metal strip or a corresponding ferrite coating is then arranged on the support 44. However, care has to be taken that the soft magnetic material 64 on the support 44 does not hinder the flexibility of this support 44 with its flat coil 50 or follows any corresponding bending of the support 44.

On account of the relatively strong action of the field on the flat coil 50, the effective inductance may easily be measured since, in particular, signal level swings in the order of magnitude of 20% or more can occur. The inductance itself may be determined, for example, via a frequency measurement of an oscillator frequency of an oscillator, to which the flat coil 50 is coupled. The frequency thereby depends on the root of the effective inductance of the flat coil 50.

When the flat coil 50 is designed accordingly or the soft magnetic material 64 is structured accordingly, the alteration in the inductance is essentially linear (cf. FIGS. 7 and 8) over the measurement path parallel to the measurement direction 56, i.e. over the relative distance between the transmitter 58 and the sensor 48 in the measurement direction 56, insofar as a constant distance is maintained between the transmitter 58 and the sensor 48 during the relative movement in the measurement direction 56.

The functioning of the inventive position measuring system is based on the fact that the transmitter is coupled to an effective sensor area, wherein the size of the effective sensor area is dependent on the relative position between transmitter and sensor transversely to a distance direction between them. In the first embodiment 10, the effective sensor area is determined by the projected overlap of a surface area of the tongue-shaped metallic transmitter 36 with the flat coil 16. The effective sensor area is essentially that area which can be coupled electromagnetically to the transmitter 36 and this coupling is, again, influenced by that surface area of the transmitter 36 which is located above the flat coil 16.

In the second embodiment 42, the effective sensor area varies over the geometric shape of the flat coil 50 in measurement direction 56. As a result, the geometric surface area of the sensor area, to which the transmitter 58 can, in fact, be coupled, varies in the measurement direction 56. When a soft magnetic material 64 is provided, the geometric effect is intensified by an electromagnetic coupling since the soft magnetic material 64 can only be brought into a state of saturation locally, namely essentially only in a field area of the magnetic transmitter 58 acting upon the flat coil 50 outside a stray field area so that the position of the transmitter 58 relative to the flat coil 50 determines its effective inductance.

In the embodiment according to FIG. 1, the geometric factor of the electromagnetic coupling between transmitter 36 and sensor 12 is determined by a corresponding surface area of the tongue-shaped transmitter 36 whereas in the embodiment 42 according to FIG. 2 the geometric factor is determined by the shape of the flat coil 50 with a varying transverse extension 54. The position measuring system 42 is therefore particularly suitable for detecting the position of a transmitter 58 which is guided on a curved path.

Figure 3:
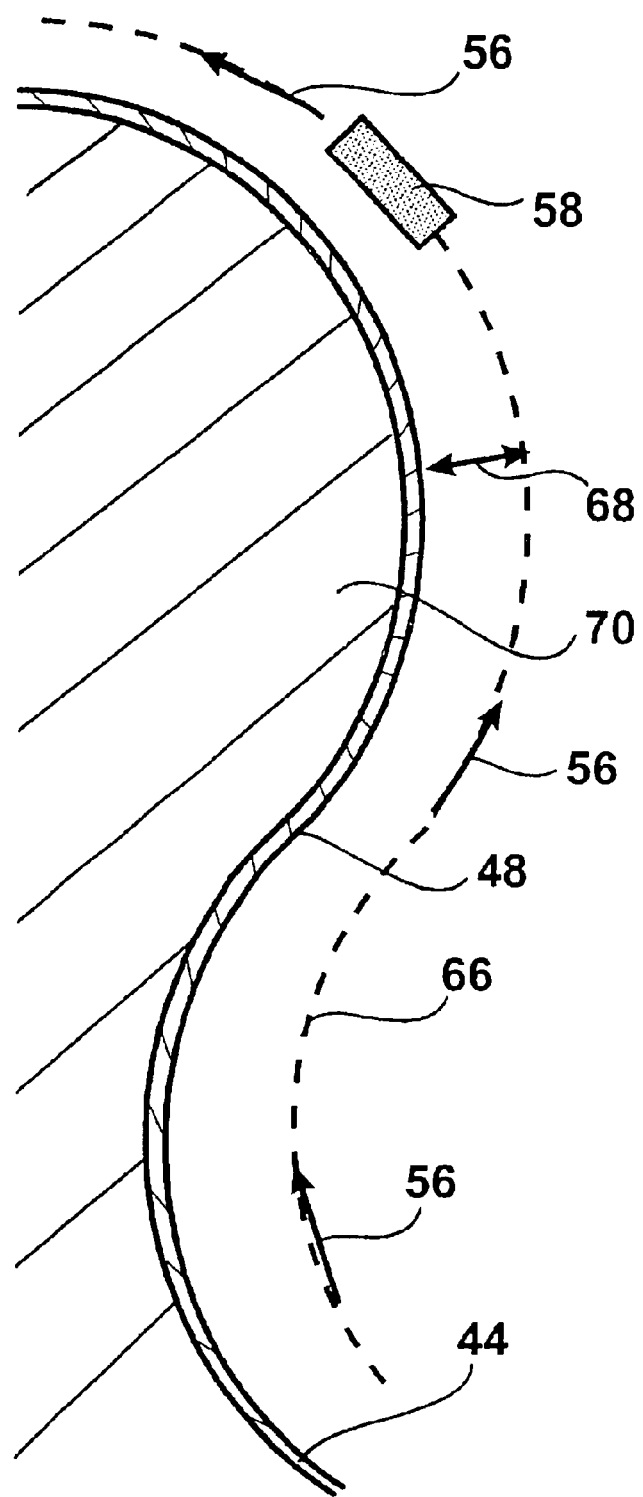
FIG. 3 shows schematically the arrangement of a position measuring system on a curved body for determining distances on curved paths.

This is shown by way of example in FIG. 3:

The transmitter 58, for example, a permanent magnet moves on a curved path 66. In order to keep a distance 68 between the sensor 48 and the transmitter 58 constant so that a change in the signal of the sensor 48 (i.e., in particular, a change in the effective inductance) is caused solely by a change with respect to the measurement direction 56, the flexible support 44 is adapted to the path 66 such that this distance 68 is kept constant. For example, the support 44 is, for this purpose, arranged on a holder 70 shaped accordingly.

The effective sensor area of the flat coil 50 on the support 44 varies in the measurement direction 56 and so the relative position of the transmitter 58 in relation to the sensor 48 on the path 66 can be determined along the path 66.

In the use just described, the transmitter 58 is guided on a curved path 66 and the sensor 48 is adapted to this curved path via the support 44. An additional use is for the curved position measurement path to be made available via the sensor 48 itself, wherein a relative position of another object relative to this is intended to be monitored.

For example, the support 44 may be closed like a ring and, therefore, be arranged on a cylindrical object. The flat coil 50 is then arranged towards the outside.

As a result of a flexible design of a support with an inductive element arranged thereon, the usable measurement range of a position measuring system may be increased in size in accordance with the invention.

Figure 4:
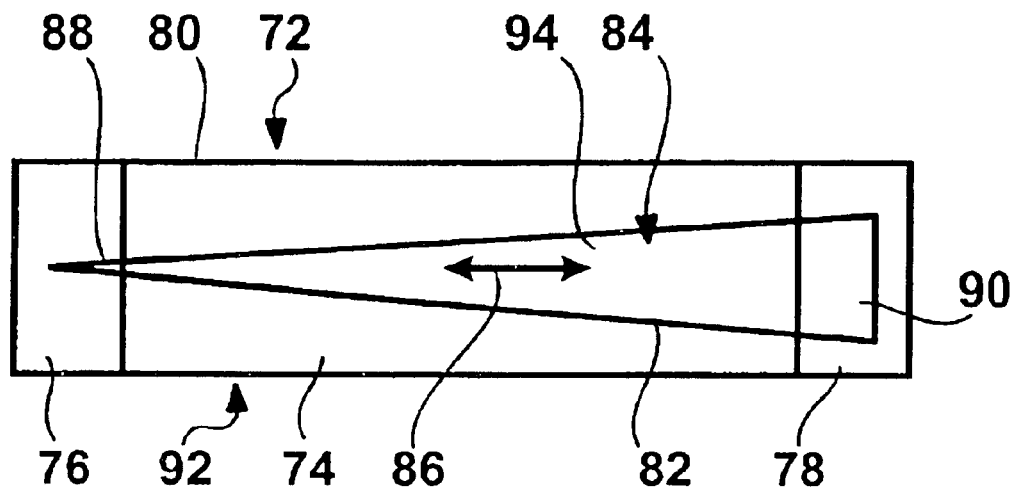
FIG. 4 shows a sensor support of an additional embodiment of an inventive position measuring system which has flexible edge sections.

In a third embodiment which is shown schematically in FIG. 4, a support 72 comprises a measurement section 74 and oppositely located edge sections 76 and 78 arranged at the measurement section. These edge sections 76 and 78 are of a flexible design whereas the measurement section 74 is rigid. This may be achieved, for example, in that the support 72 comprises a subsupport 80 with essentially the dimensions of the measurement section 74, on which the support 72, designed as a flexible foil, is arranged. The measurement section 74 and the edge sections 76 and 78 are then formed in one piece by means of this flexible foil and the measurement section 74 is that area of the flexible foil which is connected to the rigid subsupport 80.

An inductive element 82 is arranged areally on the support 72, for example, as a printed coil with triangular windings, as described on the basis of the second embodiment 42. The windings of the inductive element 82 are imprinted not only on the edge section 76 but also on the edge section 78, i.e. a surface area 84 of the inductive element 82 extends over the measurement section 74 into the edge sections 76 and 78, as well. Edge areas 88, 90 of the inductive element 82 arranged at the ends with respect to a measurement direction 86 are located on the associated edge sections 76 and 78 outside the measurement section 74.

The edge area 88 on the edge section 76 is, in the case of a triangular flat coil 82, that area which is comprised by the tip of the triangle in relation to the measurement direction 86 and the edge area 90 which is arranged on the edge section 78 is the area of the base of the triangle in relation to the measurement direction 86. These edge areas 88 and 90 are end areas of the inductive element 82, in which the conditions differ from those in the rest of the inductive element 82. For example, the density of windings is increased in the area of the tip, i.e. in the edge area 88. In the edge area 90, the angular course of the windings is different to the rest of the flat coil 82 (cf. FIG. 2; windings which are present parallel to the transverse extension 54 are restricted to the edge area 90). In addition, a transition from an, in principle, effective sensor area, on which the inductive element 82 is arranged, to a non-effective area, at which no electromagnetic coupling between a transmitter and the sensor results, is brought about at the edge areas 88 and 90.

Figure 5:
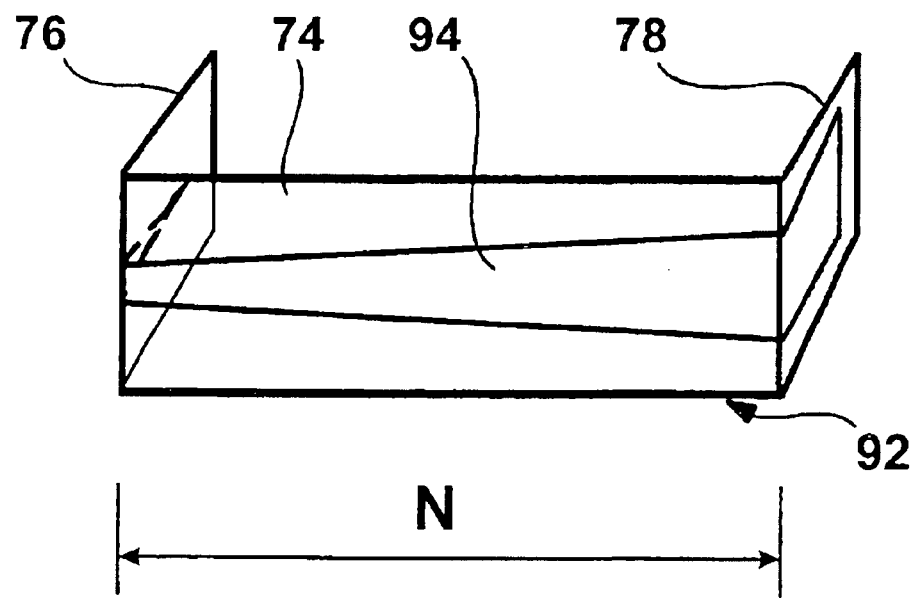
FIG. 5 shows the sensor support according to FIG. 4, wherein the flexible edge sections are folded away from a measurement section.

A usable longitudinal area N (FIG. 5) may be formed due to the fact that the flexible edge sections 76 and 78 of the support 72 are bent away from the measurement section 74 so that they are located outside a measurement field of the sensor 92, wherein this measurement field is located above the measurement section 74 with the coil area 94 located thereon; this coil area 94 comprises the inductive element 82 minus the edge areas 88 and 90.

The edge sections 76 and 78 are bent away from the measurement section 74 in that they are, for example, folded away from it and are rolled or are bent behind the subsupport 80 in order to essentially not increase the spatial dimensions of the distance measuring system transversely to the measurement direction in this way.

The useful area N of the inventive position measuring system essentially extends over the entire length of the measurement section 74 with respect to the measurement direction 86. The interfering edge effects, caused by the edge areas 88 and 90 of the flat coil 82, are not present within the measurement section 74 and, therefore, within the measurement field due to the edge sections 76 and 78 being folded away. With respect to the dimensions of the support 72 in the measurement direction 86, a larger useful area (in the embodiment of FIG. 5 with a length N) may thus be used in accordance with the invention than when no flexible, foldable edge sections 76, 78 are present; in the latter case, the support would be larger by the length of the edge sections 76 and 78.

A partially flexible design of a support for the inductive element, to which a transmitter is coupled, may also be achieved, for example, in that a flexible edge section is arranged at the respective ends of a printed circuit board and a printed coil is applied to the support comprising the edge sections.

In order to increase the size of the usable measurement area, the measurement section 74 need not necessarily be rigid, as well, but can itself be of a flexible design in order to be able to record, for example, a position determination during the movement of a transmitter on a curved path.

In FIG. 6, a support 96 is shown which has at a lateral end an edge section 98 which can be folded at an edge 100 so that a measurement section 102 of the support is essentially limited by this edge 100. An imprinted flat coil 104 is arranged on the support 96 and this is of a triangular design in accordance with the flat coil 50 in FIG. 2. An edge area 106 of this flat coil on the base side is located in the edge section 98 and can thus be folded away from the measurement section 102.

The measured effective inductance Ls of the flat coil 104 over the distance s is shown in FIG. 7. The zero point of the position determination (s=0) is located outside a tip 108 of the flat coil, wherein the measurement direction 110 extends parallel to a longitudinal edge of the support 96. A permanent magnet 111 is used as transmitter and this is guided over the flat coil 104 in the measurement direction 110 at a constant distance in relation to the support 96.

The dashed curve 112 in FIG. 7 shows the course of this effective inductance Ls when the edge section 98 is not folded away, i.e. the measurement section 102 and the edge section 98 are essentially located in one plane.

Proceeding from the zero point s=0, the effective inductance decreases approximately linearly in the direction of greater distances (in the direction of greater transverse extensions of the flat coil 104—in this area, the dashed curve 112 coincides with the solid curve). It reaches a minimum 114.

The position measuring system according to FIG. 6 therefore has a monotony area 116, in which a distance s may be clearly associated with an effective inductance Ls.

By folding away the edge area 106, a measured effective inductance Ls is obtained which is illustrated in FIG. 7 as a solid line. This corresponding curve 118 is, therefore, strictly monotonic, i.e. in contrast to the curve 112, a clear value s may be associated with each Ls.

If the edge section 98 is folded away, the usable measurement range is given by the length N, wherein N is located in the vicinity of the edge 100; if the edge section 98 is not folded away, the path area from N up to the end 120 of the support 96 cannot be used. The inventive position measuring system therefore allows the length dimension of the support 96 to be kept small with the same useful area or a greater useful area to be achieved with the same length.

The point which defines the useful area N is located somewhat in front of the folding edge 100 since the transmitter 111 has a finite extension and when traveling over an end 122 above the edge 100 is still located only partially in the measurement field above the measurement section 102. The point N is therefore defined by the fact that the magnetic field of the transmitter 111 is still just acting completely on the measurement field at this point.

In comparison, FIG. 8 shows the deviation ΔLs of the effective inductance Ls from the value of the effective inductance Ls at s=0. In this case, as well, the same course of the curve as in FIG. 7 is apparent, wherein the curve is shown as a dashed line when the edge section 98 is not folded away and, as a solid line, the curve in the case of an edge section 98 folded away from the measurement field.

What is claimed is:

1. Position measuring system comprising:
   a transmitter and a sensor comprising at least one inductive element, to which the transmitter is coupled electromagnetically,
   wherein:
      sensor and transmitter are positionable relative to one another and the at least one inductive element is arranged on a support so as to be areally extended,
      the support with the at least one inductive element is designed to be at least partially flexible,
      the support comprises a rigid support section and one or more flexible support sections extending from the rigid support section, and
      at least one of said one or more flexible support sections is adapted to be deformed by bending away from the rigid support section.

2. Position measuring system as defined in claim 1, wherein the at least one inductive element is imprinted on the support.

3. Position measuring system as defined in claim 1, wherein the support comprises a flexible foil.

4. Position measuring system as defined in claim 1, wherein for providing a usable measurement range with respect to the at least one inductive element one or more edge sections of the support are arranged with respect to a measurement section of the support in such a manner that they are located outside a measurement field.

5. Position measuring system as defined in claim 4, wherein the measurable path is determined essentially by the length of the measurement section.

6. Position measuring system as defined in claim 4, wherein end edge areas of the at least one inductive-element are located outside the measurement field due to the edge section or sections of the support.

7. Position measuring system as defined in claim 4, wherein the measurement section of the support is of a rigid design.

8. Position measuring system as defined in claim 4, wherein the edge section or sections of the support are arranged so as to be flexible with respect to the measurement section.

9. Position measuring system as defined in claim 8, wherein an edge section is designed as a flexible foil arranged on the measurement section.

10. Position measuring system as defined in claim 8, wherein an edge section is arranged on the measurement section so as to be bent away or to be bendable away from it.

11. Position measuring system as defined in claim 10, wherein the edge section or sections are positioned behind the support in relation to a measurement field.

12. Position measuring system as defined in claim 10, wherein an edge section is rolled.

13. Position measuring system as defined in claim 10, wherein an edge section is folded.

14. Position measuring system as defined in claim 1, wherein the at least one inductive element is a printed coil.

15. Position measuring system as defined in claim 1, wherein the at least one inductive element is coupled to an oscillator and influences this via a factor Q and/or an effective inductance.

16. Position measuring system as defined in claim 15, wherein the factor Q and/or effective inductance of the at least one inductive element is determined by the size of an effective sensor area to which the transmitter is coupled, and wherein the sensor is designed such that the size of the effective sensor area is dependent on the relative position between transmitter and sensor transversely to a distance direction.

17. Position measuring system as defined in claim 16, wherein the sensor is designed such that an area of overlap between a projection of an effective transmitter area onto the sensor with an effective sensor area is dependent on the relative position between sensor and transmitter transversely to the direction of projection.

18. Position measuring system as defined in claim 15, wherein an evaluation unit is provided for determining a characteristic value of the oscillator.

19. Position measuring system as defined in claim 18, wherein a frequency of the oscillator is determined.

20. Position measuring system as defined in claim 18, wherein an amplitude of the oscillator is determined.

21. Position measuring system as defined in claim 18, wherein the evaluation unit is arranged on a support, the inductive element being seated on said support.

22. Position measuring system as defined in claim 18, wherein an error signal is derivable from the evaluation unit, wherein it is possible to check by means of the evaluation unit whether one or more parameters of the inductive element are within a tolerance range.

23. Position measuring system as defined in claim 1, wherein the measurable path is determined by the length of a measurement section, the at least one inductive element being arranged on said measurement section such that end edge areas of the at least one inductive element are located outside the measurement section.

24. Position measuring system as defined in claim 1, wherein the transmitter is a passive element.

25. Position measuring system as defined in claim 1, wherein the transmitter comprises a magnet.

26. Position measuring system as defined in claim 1, wherein a soft magnetic material is arranged on the at least one inductive element or in the vicinity of the at least one inductive element.

27. Position measuring system as defined in claim 26, wherein the soft magnetic material is arranged in such a manner that it is adapted to be brought into a state of saturation locally at an effective sensor area.

28. Position measuring system as defined in claim 26, wherein the soft magnetic material is applied to a support, the at least one inductive element being seated on said support.

29. Position measuring system as defined in claim 26, wherein a soft magnetic material is wound around a support, the at least one inductive element being seated on said support.

30. Position measuring system as defined in claim 1, wherein the at least one inductive element is of such a design that its shape transverse to a measurement path varies along the measurement path.

31. Position measuring system as defined in claim 1, wherein a magnetic screening is provided for the position measuring system.

32. Position measuring system as defined in claim 1, wherein the sensor is designed such that via the corresponding shaping a specific characteristic curve of the position measuring system for a sensor signal is adjusted as a function of a measurement path.

33. Position measuring system as defined in claim 1, wherein the at least one inductive element is of a triangular design.

34. Position measuring system as defined in claim 33, wherein the at least one inductive element has triangular windings.

* * * * *